United States Patent

Uhm et al.

Patent Number: 6,044,663
Date of Patent: Apr. 4, 2000

[54] IMPREGNATED VITREOUS (GLASSY) CARBON GRAPHITE LINER AND HEATING ELEMENT FOR A FIBER OPTIC DRAW FURNACE

[75] Inventors: Daniel D. Uhm, Vinton; Robert A. Spencer, Roanoke, both of Va.

[73] Assignee: Alcatel, Paris, France

[21] Appl. No.: 09/047,865

[22] Filed: Mar. 25, 1998

Related U.S. Application Data

[60] Provisional application No. 60/041,728, Mar. 27, 1997.

[51] Int. Cl.$^7$ .................................................. C03B 13/16
[52] U.S. Cl. .................. 65/374.1; 65/374.13; 65/374.15; 423/445 R
[58] Field of Search ........................... 65/374.15, 374.13, 65/509, 537; 423/447.1, 447.2, 445 R

[56] References Cited

U.S. PATENT DOCUMENTS

| | | |
|---|---|---|
| 2,837,412 | 6/1958 | Bennett . |
| 3,350,182 | 10/1967 | Hunter et al. . |
| 3,582,305 | 6/1971 | Dunlap et al. . |
| 3,634,116 | 1/1972 | Woerner et al. . |
| 3,664,859 | 5/1972 | Beatty et al. . |
| 3,969,124 | 7/1976 | Stewart . |
| 4,100,314 | 7/1978 | Wallouch ................................ 427/228 |
| 4,126,436 | 11/1978 | Bailey . |
| 4,157,906 | 6/1979 | Bailey . |
| 4,174,842 | 11/1979 | Partus . |
| 4,277,270 | 7/1981 | Krohn . |
| 4,277,271 | 7/1981 | Krohn . |
| 4,279,952 | 7/1981 | Kadama et al. . |
| 4,309,201 | 1/1982 | Klop et al. . |
| 4,373,943 | 2/1983 | Gouronnec et al. . |
| 4,400,190 | 8/1983 | Briere . |
| 4,407,666 | 10/1983 | Briere . |
| 4,550,015 | 10/1985 | Korb et al. . |
| 4,582,632 | 4/1986 | Rokuju et al. . |
| 4,608,473 | 8/1986 | Paek et al. . |
| 4,668,496 | 5/1987 | Korb et al. . |
| 4,673,427 | 6/1987 | Van Der Giessen et al. . |

(List continued on next page.)

FOREIGN PATENT DOCUMENTS

| | | |
|---|---|---|
| 237829 | 12/1959 | Australia ........................... 423/445 R |
| 0380054 | 8/1990 | European Pat. Off. . |
| 0653383 | 5/1995 | European Pat. Off. . |
| 2386004 | 10/1978 | France . |
| 2818550 | 3/1979 | Germany . |
| 3025680 | 2/1982 | Germany . |
| 53-135648 | 11/1978 | Japan . |
| 58-161939 | 9/1983 | Japan . |
| 2242579 | 9/1990 | Japan . |
| 4349138 | 12/1992 | Japan . |
| 1223080 | 2/1971 | United Kingdom . |
| 1523595 | 9/1978 | United Kingdom . |
| 2083012 | 3/1982 | United Kingdom ............... 423/445 R |
| 2192698 | 1/1988 | United Kingdom . |
| 2218789 | 11/1989 | United Kingdom . |

OTHER PUBLICATIONS

"Drawing Techniques for Optical Fibers," by Motohiro Nakahara et al., Review of the Electrical Communication Laboratories, vol. 26, Nos. 3–4, Mar.–Apr. 1978.

(List continued on next page.)

*Primary Examiner*—Stanley S. Silverman
*Assistant Examiner*—Jacqueline A. Ruller
*Attorney, Agent, or Firm*—Ware, Fressola, Van der Sluys & Adolphson LLP

[57] ABSTRACT

The present invention provides an improvement to a fiber optic draw furnace for drawing an optical fiber from a preform. The fiber optic draw furnace has a heating element having a shape for enclosing and heating the preform, and has a graphite liner having a corresponding shape to the shape of the heating element for providing a barrier between the heating element and the preform. In the fiber optic draw furnace, either the graphite liner is a high density extruded graphite liner that is impregnated with vitreous carbon completely through its entire graphite liner matrix, or the heating element is a high density extruded graphite heating element that is impregnated with vitreous carbon completely through its entire graphite heating element matrix, or both.

10 Claims, 4 Drawing Sheets

U.S. PATENT DOCUMENTS

| | | |
|---|---|---|
| 4,911,742 | 3/1990 | Newbould et al. . |
| 4,950,319 | 8/1990 | Lane et al. . |
| 4,988,374 | 1/1991 | Harding et al. . |
| 5,017,209 | 5/1991 | Yoshimura . |
| 5,076,824 | 12/1991 | Miller . |
| 5,120,341 | 6/1992 | Nozawa et al. . |
| 5,225,379 | 7/1993 | Howard . |
| 5,259,856 | 11/1993 | Ohga et al. . |
| 5,284,499 | 2/1994 | Harvey et al. . |
| 5,292,460 | 3/1994 | Kyutoku et al. . |
| 5,308,947 | 5/1994 | Fleming, Jr. . |
| 5,320,658 | 6/1994 | Ohga et al. . |
| 5,350,433 | 9/1994 | Baniel . |
| 5,545,246 | 8/1996 | Lysson et al. . |
| 5,637,130 | 6/1997 | Nagayama et al. . |
| 5,688,155 | 11/1997 | Lewis et al. ............................ 442/179 |
| 5,705,139 | 1/1998 | Stiller et al. ........................ 423/445 R |

OTHER PUBLICATIONS

"Drawing Lightguide Fiber," by David H. Smithgall et al., Western Electric Eng. (USA), vol. 24, No. 1, Winter 1980.

"Patent Abstract of Great Britain," Application No. GB197809, Payne et al., "Electrical Resistance Furnaces," Oct. 31, 1974.

"Patent Abstract for German Patent," Application No. 2818550, K. Yoshimura et al., "Drawing optical fibre from prefabricated blank . . . " Mar. 15, 1979.

"Patent Abstract of Japan," Application No. 0242579, Tokai Carbon KK, "Graphite heating element mfr.–by interposition polyimide adhesive . . . " Sep. 1990.

"Patent Abstract of Japan," Application No. 52–50298, K. Yoshimura et al., "Production of Fibers For Optical Communication," Nov. 27, 1978.

"Patent Abstract of Japan," Application No. 58–161939, Nippon Teleg & Teleph., "Optical fibre spinning furnace—having metal carbide . . . " Sep. 26, 1983.

"Patent Abstract of Japan", Fujikura Ltd., vol. 17, No. 205 (C–1051), Apr. 22, 1993, "Furnace Core Tube for Producing Optical Fiber", Publication No. 04349138, Dec. 3, 1992.

"Patent Abstract of Japan", Fujikura Ltd., vol. 95, No. 1, Feb. 28, 1995, "Core Tube For Drawing Optical Fiber", Publication No. 06279045 A, Oct. 4, 1994.

"Patent Abstract of Japan", Hitachi Chem Co Ltd., vol. 12, No. 270 (C–515), Jul. 27, 1988, "Heating Element for Spinning", Publication No. 63050343 A, Mar. 3, 1988.

"Patent Abstract of Japan", Mitsubishi Cable Ind Ltd., vol. 095, No. 006, Jul. 31, 1995, "Optical Fiber Drawing Furnace", Publication No. 07081967, Mar. 28, 1995.

Matsuda, Y. et al., "Development of Large Preform Drawing Technique and its Application to High Performance Dual Coated Optical Fiber Fabrication", European Conference on Optical Communication, Brighton, Sep. 11–15, 1988, vol. Part 1, No. Conf. 14, Sep. 11, 1988, Insttitution of Electrical Engineers, pp. 437–400, XP000145161.

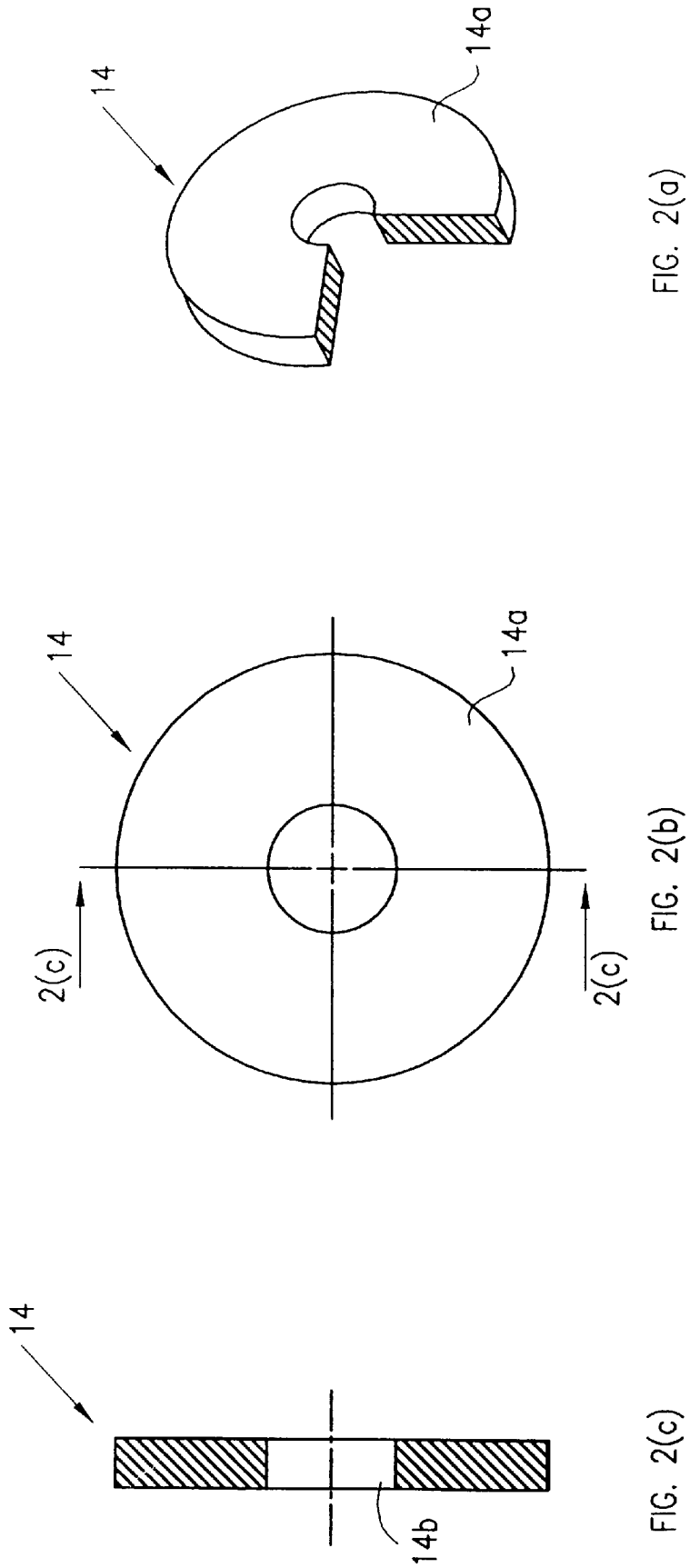

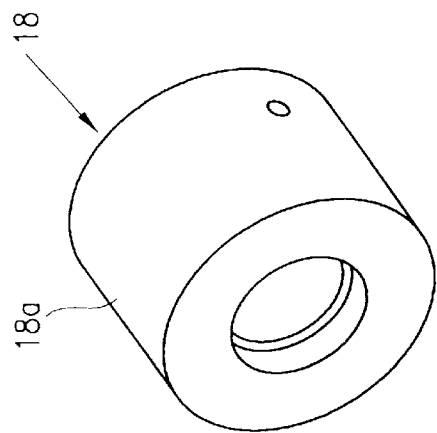
FIG. 3(a)
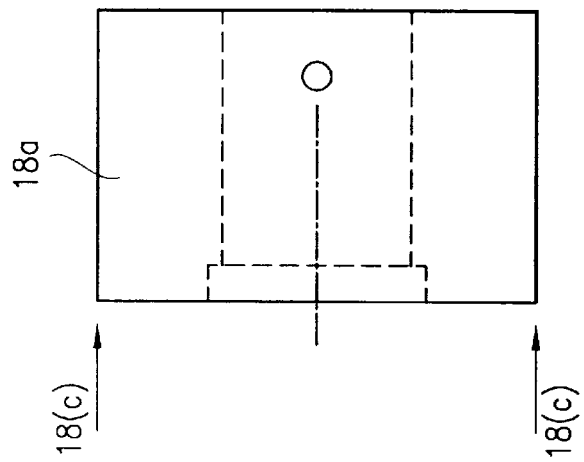
FIG. 3(b)
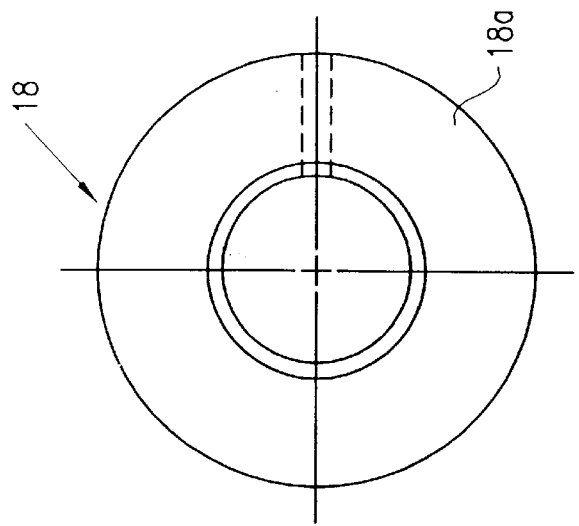
FIG. 3(c)
FIG. 3

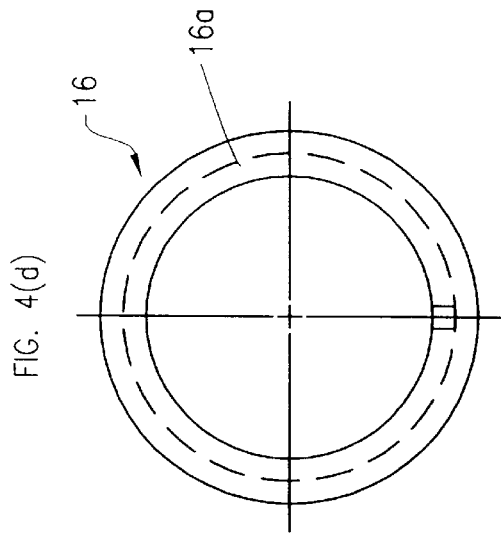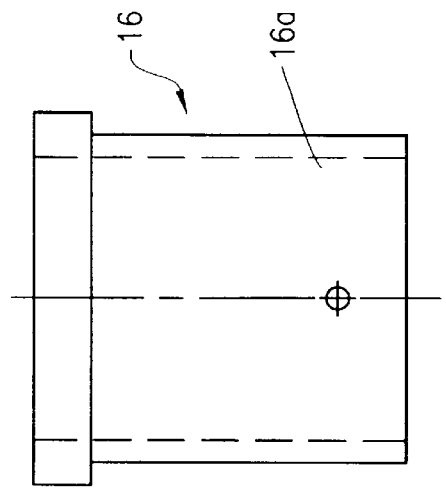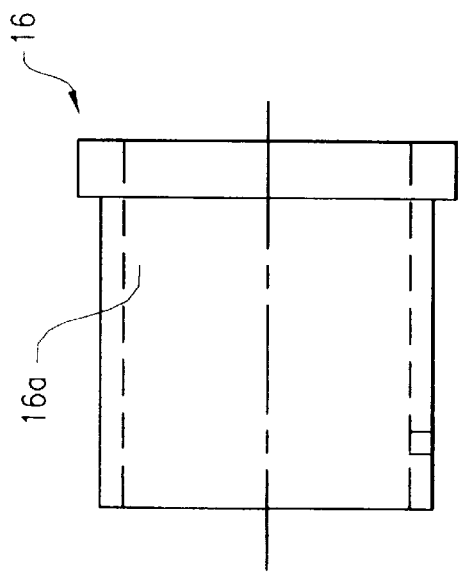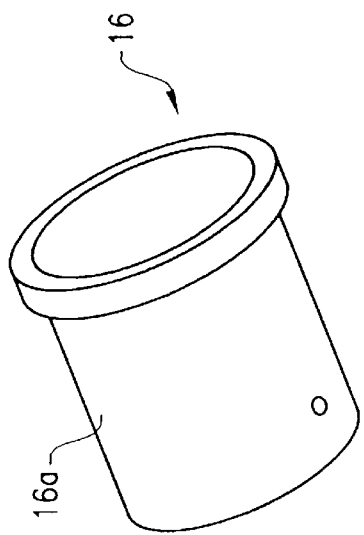
FIG. 4

IMPREGNATED VITREOUS (GLASSY) CARBON GRAPHITE LINER AND HEATING ELEMENT FOR A FIBER OPTIC DRAW FURNACE

This application claims the benefit of U.S. Provisional 60/041,728 Filing Date Mar. 27, 1997.

BACKGROUND OF THE INVENTION

1. Field of Invention

The present invention relates to a fiber optic draw furnace for making optical fiber; and more particularly to liners and heating elements for graphite resistance and inductance furnaces.

2. Discussion of Related Art

Known graphite resistance fiber optic draw furnaces typically have a standard extruded graphite liner or heating element that is nonhomogeneous and low in density. The standard extruded graphite liner or heating element has high porosity (high surface area) that makes its material more reactive with oxygen and silica and more susceptible to erosion from thermal stress. The standard graphite liner or heating element is also susceptible to moisture and oxygen absorption. Nonhomogeneous physical properties can result in uneven heating around the circumference of the preform and can increase the odds of catastrophic failure.

Other known draw furnaces use isomolded graphite liners that are much higher in density than the extruded graphite liners. However, the isomolded graphite is very expensive, which significantly adds to the cost of producing optical fiber.

SUMMARY OF THE INVENTION

The present invention provides an improvement to a fiber optic draw furnace for drawing an optical fiber from a preform. The fiber optic draw furnace has a heating element having a shape for enclosing and heating the preform, and has a graphite liner having a corresponding shape to the shape of the heating element for providing a barrier between the heating element and the preform.

In the fiber optic draw furnace, either the graphite liner is a high density extruded graphite liner that is impregnated with vitreous carbon completely through its entire graphite liner matrix, or the heating element is a high density extruded graphite heating element that is impregnated with vitreous carbon completely through its entire graphite heating element matrix, or both.

The vitreous (glassy) carbon impregnated high density extruded graphite liner is much more economical than the prior art isomolded graphite liner with comparable improvements in performance and life over standard extruded graphite liners; does not flake or delaminate on the surface since the graphite is impregnated and not "coated"; produces a spectrographically clean surface (loose graphite particles are "locked" in) that will introduce fewer contaminants into the process environment (dramatically reduces graphite dust and particulate generation); improves thermal uniformity of the liner (uniform and continuous carbon matrix); and has a lower moisture and oxygen absorption than the prior art liners that are not impregnated.

The vitreous (glassy) carbon impregnated high density extruded graphite heating element is much more economical than isomolded graphite heating elements with comparable improvements in performance and life over the standard extruded graphite heating element; produces a spectrographically clean surface (loose graphite particles are "locked" in) that will introduce fewer contaminants into the process environment (dramatically reduces graphite dust and particulate generation); improves the electrical uniformity of the heating element (uniform and continuous carbon matrix); has lower moisture and oxygen absorption than the prior art heating element that is not impregnated; provides greater resistance to erosion from thermal stress; provides even uniform heating around the circumference of the preform; and provides improved consistency and reliability in operation.

The present invention may be used in draw furnaces such as a graphite resistance or inductance fiber optic draw furnace.

BRIEF DESCRIPTION OF THE DRAWING

The invention, both as to its organization and manner of operation, may be further understood by reference to a drawing (not drawn to scale) which includes FIGS. 1–4, taken in conjunction with the following description.

FIG. 2, including FIGS. 2(a), 2(b) and 2(c), is an illustration of a rigid bottom insulation ring of the fiber optic draw furnace shown in FIG. 1.

FIG. 3, including FIGS. 3(a), 3(b) and 3(c), is an illustration of a rigid insulation canister of the fiber optic draw furnace shown in FIG. 1.

FIG. 4, including FIGS. 4(a), 4(b), 4(c), is 4(d) are an illustration of an insulation insert shown of the fiber optic draw furnace shown in FIG. 1.

BEST MODE OF THE INVENTION

Fiber Optic Draw Furnace 10

Figure 1:
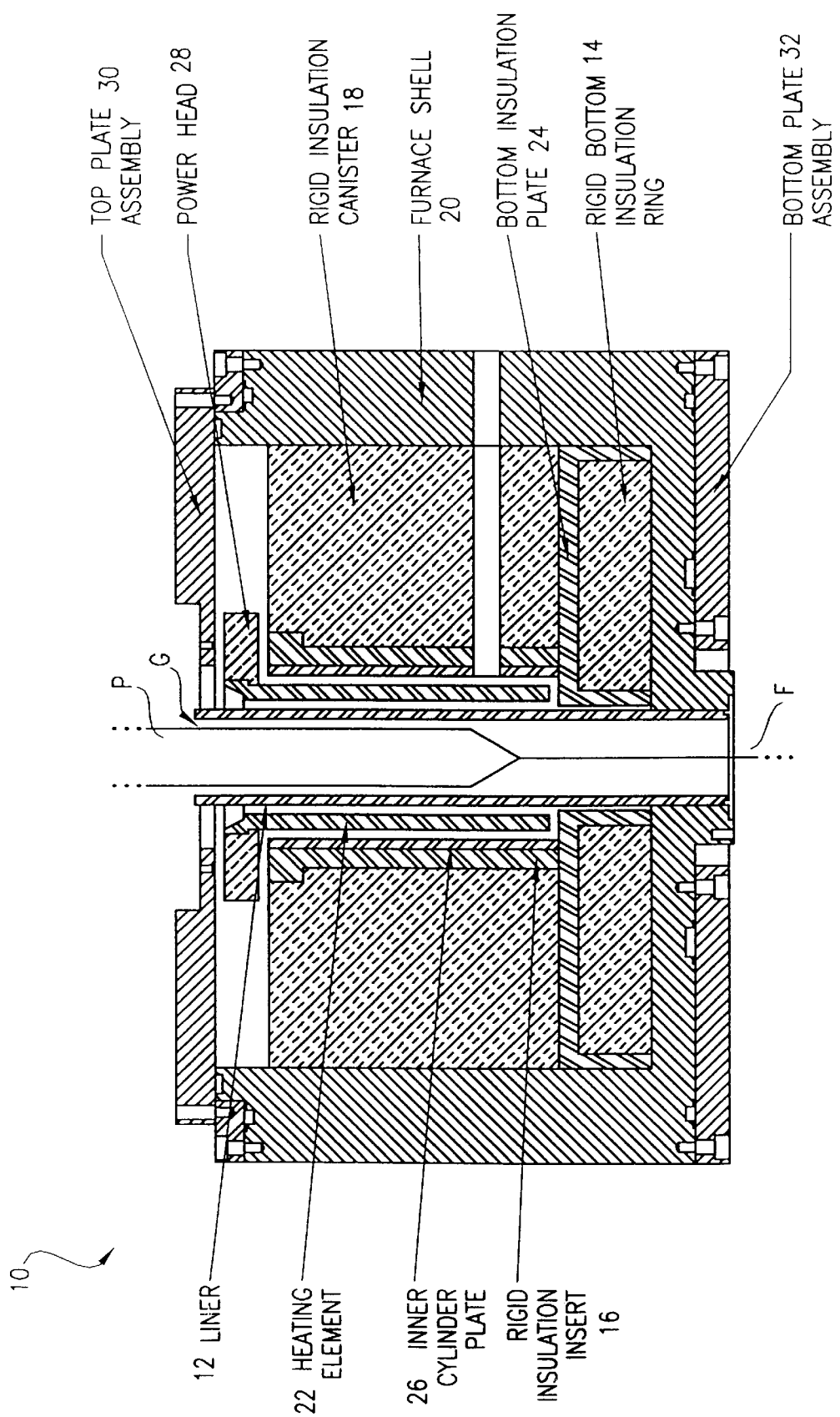
FIG. 1 is a schematic diagram of a fiber optic draw furnace, which is the subject matter of the present invention.

FIG. 1 shows part of a graphite resistance fiber draw furnace generally indicated as 10 for drawing an optical fiber (F) from a preform (P). The graphite resistance fiber draw furnace 10 includes a graphite liner 12, a bottom insulation ring 14, an insulation insert 16, an insulation canister 18, a furnace shell 20, a heating element 22, a bottom graphite insulation plate 24, an inner graphite cylinder 26, a power head 28, a top plate assembly 30 and a bottom plate assembly 32.

High Density Extruded Graphite Liner 12

In FIG. 1, the high density extruded graphite liner 12 has a cylindrical shape, and the heating element 22 is cylindrical and arranged around the high density extruded graphite liner 12. The graphite liner 12 is a high density extruded graphite liner that is impregnated with vitreous carbon completely through its entire graphite liner matrix. The high density extruded graphite liner 12 provides an improved barrier between the graphite heating element 22 and the fiber optic preform (P) that is comparable to an isomolded graphite liner but much more economical in cost.

High Density Extruded Graphite Heating Element 22

In FIG. 1, the heating element 22 is a high density extruded graphite heating element that is impregnated with vitreous carbon completely through its entire graphite heating element matrix, making the graphite furnace 10 effectively a high temperature thermal energy source. The impregnation of a lower grade graphite (low density extruded) with vitreous (glassy) carbon produces a heating element that is comparable in performance and benefits to expensive high density isomolded graphite heating elements with several additional benefits, as discussed above.

Rigidified High Purity Graphite Felt Insulation 14, 16, 18

In FIG. 1, the insulation 14, 16, 18 are made from rigidified high purity graphite felt that provides highly efficient thermal insulation between the graphite heating element 22 and the outer furnace shell 20. Rigidified high purity graphite felt is known in the art, and consists of a homogeneous mixture of graphite fibers and a graphite-based resin that is solidified. The insulation 14, 16, 18 is shown in greater detail in FIGS. 2–4, including the bottom insulation ring 14 in FIG. 2, the insulation canister 18 in FIG. 3 and the insulation insert 16 in FIG. 4, and discussed in greater detail below.

The bottom insulation ring 14 in FIG. 2 is shown in FIGS. 2(a), (b), (c) and has a top surface with a thin layer of reflective graphite resin generally indicated as 14a, a ring opening 14b for fitting around the graphite liner 12, and a bottom surface (not shown). The function of the bottom insulation ring 14 is to insulate thermally the bottom of the furnace shell 20 from the high temperature heating element 22. The bottom insulation ring 14 is manufactured by machining the rigidified high purity graphite felt into its final dimensions. The machined material may be then coated on all surfaces with a thin layer of reflective graphite resin generally indicated as 14a that provides enhanced thermal insulating properties, which results in improved efficiency and increased life of the graphite heating element 22. In addition, the coating 14a provides a clean surface free of graphite particles and graphite fibers which is essential for the manufacturing of high strength optical fiber. The coating 14a also adds mechanical strength.

The insulation canister 18 and the insulation insert 16 are respectively shown in FIGS. 3–4. The function of the insulation insert 16 and the insulation canister 18 is to thermally insulate the side of the furnace shell 20 from the heating element 22. The insulation insert 16 (FIG. 4) fits into the inner diameter of the insulation canister 18 (FIG. 3). All surfaces are coated with either a reflective graphite resin or a thin layer of reflective graphite foil laminated onto the surface of the rigid insulation material. The reflective graphite resin or the thin layer of reflective graphite foil are generally indicated as 16a, 18a. Similar to the bottom insulation ring 14, the insulation insert 16 and the insulation canister 18 are manufactured by machining the rigidified high purity graphite felt into its final dimensions. The graphite foil and/or reflective coating 16a, 18a on all of their respective surfaces results in improved thermal efficiency of the furnace and increased life of the heating element 22. In addition, the graphite foil and/or reflective coating 16a, 18a provides a clean surface free of graphite particles and graphite fibers which is essential for the manufacturing of high strength optical fiber. The graphite foil and/or reflective coating 16a, 18a also adds mechanical strength.

Other advantages of the insulation ring 14, the graphite felt insulation insert 16 and the insulation canister 18 are that they have less density variation than standard felt, and therefore, have superior temperature uniformity; do not generate loose graphite particles or graphite fibers; and are resistant to moisture and oxygen absorption.

The Two-Piece, TiC Coated, Barrier Plate 24, 26

In FIG. 1, the fiber optic draw furnace 10 has a new two-piece barrier including 24, 26 that consists of the bottom graphite insulation plate 24 and the inner graphite cylinder 26. The two-piece barrier 24, 26 is arranged between the heating element 22 and the insulation pieces 14, 16, 18. The inner graphite cylinder 26 is coated on the inner diameter with titanium carbide (TiC).

The TiC coated two-piece barrier 24, 26 may have other applications in glass drawing, and manufacturing processes or industries utilizing graphite resistance furnace technologies.

The graphite resistance fiber optic draw furnace known in the prior art typically has a heating element, furnace insulation and a graphite barrier between the heating element and the furnace insulation for protecting the furnace insulation. The prior art graphite barrier produces graphite particulate that degrades the optical fiber produced therein, has a short heating element life, reduces the life of the furnace insulation, and degrades overall furnace efficiency. In contrast, the new and improved two-piece barrier plate 24, 26 having a TiC coating results in a cleaner furnace environment, which is important for manufacturing high strength optical fiber, longer heating element life, longer life of the furnace insulation, and improved furnace efficiency.

Optimal Liner/Preform Gap Range of 3.5 to 7.5 Millimeters

In FIG. 1, the graphite resistance fiber optic draw furnace 10 has an air gap G in a range of 3.5 to 7.5 millimeters (spacing) between an outer surface of the preform (P) and the inside surface of the graphite liner 12 that is maintained to minimize graphite particulate contamination of the preform and fiber during the fiber optic drawing process. The same gap G is also important for minimizing the formation of SiC during the fiber optic drawing process.

In the prior art, the significance or importance of "gap" size (spacing) between the preform (P) and the graphic liner is not given much consideration. However, it has been found that the maintenance of the air gap G in a range of 3.5 to 7.5 millimeters between the preform (P) and graphite liner 12 minimizes graphite particulate contamination of the preform P and fiber F during the fiber optic drawing process, and also minimizes the formation of SiC during the fiber optic drawing process.

The Scope of the Invention

It is also to be understood that the claims are intended to cover all of the generic and specific features of the invention herein described and all statements of the scope of the invention which, as a matter of language, might be said to fall therebetween. For example, the scope of the invention is intended to cover a fiber optic draw furnace having one or more of the aforementioned improvements.

We claim:

1. A fiber optic draw furnace (10) for drawing an optical fiber (F) from a preform (P), having a heating element (22) having a shape for enclosing and heating the preform (P), and having a graphite liner (12) having a corresponding shape to the shape of the heating element (22) for providing a barrier between the heating element (22) and the preform (P), wherein either the graphite liner (12) is a high density extruded graphite liner (12) that is impregnated with vitreous carbon completely through its entire graphite liner matrix, or the heating element (22) is a high density extruded graphite heating element (22) that is impregnated with vitreous carbon completely through its entire graphite heating element matrix, or both; and wherein the fiber optic draw furnace (10) further comprises:
an outer furnace shell (20);
a bottom insulation plate (24) having a titanium carbide coating and being arranged in the outer furnace shell (20);
a rigid bottom insulation ring (14) made of rigidified high purity graphite felt having a reflective coating (14a) and being arranged between the bottom insulation plate (24) and the outer furnace shell (20);
an inner cylinder plate (26) having a titanium carbide coating and being arranged around the heating element (22) and resting on the bottom insulation plate (24);
a rigid insulation insert (16) made of rigidified high purity graphite felt having a reflective coating (16a) being arranged around the inner cylinder (26) and resting on the bottom insulation plate (24); and
a rigid insulation canister (18) made of rigidified high purity graphite felt having a reflective coating (18a) and being arranged between the rigid insulation insert (16) and the outer furnace shell (20).

2. A fiber optic draw furnace (10) according to claim 1, wherein the graphite liner (12) is cylindrical.

3. A fiber optic draw furnace (10) according to claim 1, wherein the heating element (22) is cylindrical and arranged around the graphite liner (12).

4. A fiber optic draw furnace (10) according to claim 1, wherein the fiber optic draw furnace (10) is a graphite resistance furnace.

5. A fiber optic draw furnace (10) according to claim 1, wherein the fiber optic draw furnace (10) is an inductance furnace.

6. A graphite liner (12) for a fiber optic draw furnace having a heating element (22) with a shape for enclosing and heating a preform (P) from which a fiber (F) is drawn,
wherein the graphite liner (12) has a corresponding shape to the shape of the heating element (12) for providing a barrier between the heating element (22) and the preform (P), and
wherein the graphite liner (12) is a high density extruded graphite liner that is impregnated with vitreous carbon completely through its entire graphite liner matrix.

7. A graphite liner (12) according to claim 6, wherein the graphite liner (12) has a cylindrical shape.

8. A heating element (22) for a fiber optic draw furnace having a graphite liner (12) with a shape for providing a barrier between the heating element (22) and a preform (P) from which a fiber (F) is drawn,
wherein the heating element (22) has a corresponding cylindrical shape to the shape of the graphite liner (12) for enclosing the graphite liner (12) and heating the preform (P), and
wherein the heating element (22) is a high density extruded graphite heating element that is impregnated with vitreous carbon completely through its entire graphite heating element matrix.

9. A fiber optic draw furnace (10) according to claim 8, wherein the heating element (22) has a cylindrical shape.

10. A fiber optic draw furnace (10) for drawing an optical fiber (F) from a preform (P), having a heating element (22) having a shape for enclosing and heating the preform (P), and having a graphite liner (12) having a corresponding shape to the shape of the heating element (22) for providing a barrier between the heating element (22) and the preform (P),
wherein either the graphite liner (12) is a high density extruded graphite liner (12) that is impregnated with vitreous carbon completely through its entire graphite liner matrix, or the heating element (22) is a high density extruded graphite heating element (22) that is impregnated with vitreous carbon completely through its entire graphite heating element matrix, or both; and
wherein the fiber optic draw furnace (10) further comprises:
an outer furnace shell (20);
a bottom insulation plate (24) having a titanium carbide coating and being arranged in the outer furnace shell (20);
a rigid bottom insulation ring (14) made of rigidified high purity graphite felt having a reflective coating (14a) and being arranged between the bottom insulation plate (24) and the outer furnace shell (20);
an inner cylinder plate (26) having a titanium carbide coating and being arranged around the heating element (22) and resting on the bottom insulation plate (24);
a rigid insulation insert (16) made of rigidified high purity graphite felt having a reflective coating (16a) being arranged around the inner cylinder (26) and resting on the bottom insulation plate (24);
a rigid insulation canister (18) made of rigidified high purity graphite felt having a reflective coating (18a) and being arranged between the rigid insulation insert (16) and the outer furnace shell (20);
wherein an air gap (G) between the outer surface of the preform (P) and the graphite liner (12) is in a range of 3.5 to 7.5 millimeters; and
wherein the air gap is substantially uniform between the graphite liner (12) and the outer surface of the preform (P) about the circumference of the preform (P).

* * * * *